Patented Aug. 14, 1945

2,382,545

UNITED STATES PATENT OFFICE 2,382,545

RESIN ACID LACTONE AND METHOD FOR ITS PRODUCTION

Richard F. B. Cox, Wilmington, Del., assignor to Hercules Powder Company, Wilmington, Del., a corporation of Delaware No Drawing. Application December 10, 1942, Serial No. 468,562

8 Claims. (Cl. 260—97)

This invention relates to a new composition of matter and method of preparation. More particularly, it is concerned with a new resin acid lactone from resin acids of hydrogenated rosin and a method for its production.

It is well known that dihydroabietic and dihydrolevopimaric acids may be converted into a resin acid lactone melting at 131–132° C. The same resin acid lactone is obtained from all dihydroresin acids having a nucleus of abietic acid, and no other resin acid lactone has been obtained from these acids. Furthermore, a resin acid lactone having a melting point of 143–144° C. is known and has been described as a lactone of hydroxytetrahydropimaric acid.

Now, in accordance with this invention, a resin acid lactone has been prepared from the high melting or crystalline hydroresin acids of hydrogenated rosin. This resin acid lactone is characterized by being a crystalline solid with a melting point of 98.5–100° C., specific rotation $(a)_D - 11°$ (2% in alcohol), and the empirical formula $C_{20}H_{32}O_2$. Thus, the process of this invention comprises treating crystalline hydroresin acids of hydrogenated rosin with strong mineral acid, and recovering a resin acid lactone with the melting point 98.5–100° C., a specific rotation of $(a)_D - 11°$ (2% in alcohol) and the empirical formula $C_{20}H_{32}O_2$.

Now, having indicated in a general way, the nature and purpose of this invention, the following examples will illustrate the invention. It is to be understood, however, that such examples are presented merely as illustrative of the invention and are not to be construed as limiting the same unless otherwise indicated.

Example 1

High melting resin acids having a melting point at 237–238° C., and a specific rotation $(a)_D$ of +12°, were crystallized out of hydrogenated rosin, obtained by hydrogenation of K wood rosin using a platinum catalyst. Five parts of high melting resin acids were added in small portions with continuous stirring to 37 parts concentrated sulfuric acid at 0–10° C. After all of the acid had been added, the stirring was continued for 0.5 hour. The mixture was then poured into ice water. The precipitate that was formed was taken up in ether and washed free of acids with 1% sodium hydroxide solution. The oil left on evaporation of the ether amounting to about 4.5 parts was crystallized from hexane. It melted at 82–85° C., and after recrystallization from hexane melted at 93–95° C. Further crystallization from acetone gave a pure product, a resin acid lactone, melting at 98.5–100° C., a specific rotation of $(a)_D - 11.2°$ (2% in alcohol), and empirical formula of $C_{20}H_{32}O_2$.

Example 2

Five hundred and twenty parts of high melting resin acids melting at 195–205° C. (crystallized out of hydrogenated rosin, obtained by hydrogenation of K wood rosin using a platinum catalyst) were dissolved in 1000 parts carbon tetrachloride and added slowly with stirring at 0–10° C. to 1400 parts concentrated sulfuric acid. After stirring 0.5 hour, the mixture was poured into ice water. The carbon tetrachloride layer was separated and the diluted sulfuric acid layer was extracted with carbon tetrachloride. The combined extracts were washed free of acids with 1% sodium hydroxide solution and the solvent was distilled off. The residue left after evaporation of the carbon tetrachloride was dissolved in 1000 parts hexane and cooled. There crystallized out 114 parts lactone with a melting point of 128–130° C. The mother liquor on cooling to −80° C. yielded crystals with a melting point 92–98° C. Further crystallization from acetone gave a pure product, a resin acid lactone, melting at 98.5–100° C., a specific rotation of −11.2° (2% in alcohol), and empirical formula of $C_{20}H_{32}O_2$.

Example 3

Ninety parts crystalline acids with a melting point of 237–238° C. with specific rotation of $(a)_D + 12°$, crystallized out of hydrogenated rosin, obtained by hydrogenation of K wood rosin using a platinum catalyst, were added slowly with stirring to 1500 parts concentrated sulfuric acid at 0–10° C. After two hours the amber solution was poured into ice water and extracted with ether. The extract was washed neutral with caustic and water and evaporated to isolate 82.6 parts oil. The oil left on evaporation of the ether amounting to about 4.5 parts was crystallized from hexane. The crude product was recrystallized from hexane, and further recrystallized from acetone and a pure product, a resin acid lactone, was isolated with a melting point of 98.5–100° C., a specific rotation of $(a)_D - 11°$ (2% in alcohol), and empirical formula of $C_{20}H_{32}O_2$.

Example 4

Three parts resin acid with melting point 251–252° C., and specific rotation of $(a)_D + 25°$ C. (1% in $CHCl_3$), crystallized out of hydrogenated rosin, obtained by hydrogenation of wood rosin using a platinum catalyst, were added slowly to 55 parts concentrated sulfuric acid at 0-10° C. After 30 minutes the mixture was poured into ice water and the organic material was extracted by means of ether. The ether extract, after washing with dilute caustic and water, was dried over sodium sulfate and evaporated. The residual oil was crystallized from methanol four times to reach the maximum melting point of 98.5-99.5° C., a specific rotation of $(a)_D$ —11° (2% in alcohol), and empirical formula of $C_{20}H_{32}O_2$.

Concentrated sulfuric acid of a specific gravity of about 1.84 has been used in the examples. This is shown for purposes of illustration only. The sulfuric acid which may be employed in carrying out this invention must be of a specific gravity of at least 1.78. Other strong mineral acids may be used in place of sulfuric acid such as hydrochloric acid, hydrobromic acid, especially in anhydrous form in acetic acid solution, etc.

The high melting or crystalline hydroresin acids which may be employed are those from hydrogenated rosin. In the preparation of the crystalline hydroresin acids hydrogenated wood or gum rosin and their acids may be utilized; also rosins which have been subjected to various refining processes either before or after hydrogenation as, for example, treatment with selective color body absorbents as furfural, furfuryl alcohol, etc.; treatment with selective color body adsorbents as fuller's earth, etc. The hydrogenation may be carried out by contacting rosin with a noble metal catalyst according to the methods known to the art. These noble metal catalysts may be employed in the elemental form or in combined form such as the oxide, etc., and reduced to the active elemental form during hydrogenation.

The hydrogenated rosins employed may be of varying degree of hydrogen saturation, it being preferred to employ those rosins saturated to the extent of at least 25% of the theoretical. Unless rosins of 25% or more hydrogen saturation are employed, unsubstantial amounts of crystalline hydroresin acids are obtained.

The crystalline hydroresin acids useful for conversion to the lactone of this invention may be isolated from hydrogenated rosin by fractional crystallization or other methods, if desired. A convenient method for isolating these crystalline hydroresin acids from hydrogenated rosin is to treat at least partially hydrogenated rosin, obtained by hydrogenation of wood rosin using a platinum catalyst, with a low boiling saturated hydrocarbon containing between 3 and 8 carbon atoms and agitating at suitable temperatures until no further dissolution takes place. The crystalline hydroresin acids may then be isolated by filtration, decantation, etc.

The melting point of the crystalline hydroresin acids will vary over a wide range but generally speaking the range will be from about 200-252° C. as determined by the capillary tube method, or a melting point between about 85° and about 100° C. as determined in the resinous state by the ball and ring method.

In carrying out the process of this invention, high melting or crystalline hydroresin acids obtained, for example, by fractional crystallization from at least partially hydrogenated rosin, may be added in small portions with continuous stirring for a period of, for example 0.5 hour, to a strong mineral acid, for example concentrated sulfuric acid preferably of a specific gravity of 1.84. While the time of stirring is not critical, it has been found in practice that a suitable time is for a period of about 0.5 hour. If desired, however, the crystalline hydroresin acids may first be dissolved in any suitable organic solvent, such as carbon tetrachloride, hexane, benzene, ethylene chloride, etc. and a solution of crystalline hydroresin acids added to the strong mineral acid, such as concentrated sulfuric acid, and treated. While the temperature of the reaction mixture during the agitation or stirring is not critical, it has been found that a temperature of from about 0-10° C. is very satisfactory. After the reaction mixture has been stirred for a suitable length of time, for example 0.5 hour, the mixture may then be poured into ice water and the precipitate extracted with, for example ether. The extract may then be washed neutral with a suitable alkali, such as sodium hydroxide, and evaporated. The residual oil may then be crystallized by means of methanol, hexane, acetone, and the like and a resin acid lactone isolated with the melting point 98.5-100° C., a specific rotation of $(a)_D$ —11° (2% in alcohol), and the empirical formula $C_{20}H_{32}O_2$. Other methods of recovering the lactone and varying the steps of this process will occur to those skilled in the art.

The lactone produced by this invention differs materially from the lactone of hydroxytetrahydroabietic acid. The lactone of this invention is a crystalline solid with a melting point of 98.5-100° C., a specific rotation of $(a)_D$ —11° (2% in alcohol), and the empirical formula $C_{20}H_{32}O_2$. It may be used as a plasticizer when used in conjunction with a resin acid lactone having a melting point of 143-144° C. or may be readily converted by saponification to hydroxytetrahydro acids which may be used in soaps or many other uses.

What I claim and desire to protect by Letters Patent is:

1. The process of producing a resin acid lactone which comprises reacting crystalline hydrorosin acids with a strong mineral acid, and recovering a resin acid lactone having a melting point of 98.5-100° C., a specific rotation $(a)_D$ of —11°, and an empirical formula of $C_{20}H_{32}O_2$, the hydrorosin acids having a melting point between about 200° C. and about 252° C.

2. The process of producing a resin acid lactone which comprises reacting a solution of crystalline hydrorosin acids with a strong mineral acid, and recovering a resin acid lactone having a melting point of 98.5-100° C., a specific rotation $(a)_D$ of —11°, and an empirical formula of $C_{20}H_{32}O_2$, the hydrorosin acids having a melting point between about 200° C. and about 252° C.

3. The process of producing a resin acid lactone which comprises reacting a solution of crystalline hydrorosin acids with concentrated sulfuric acid, and recovering a resin acid lactone having a melting point of 98.5-100° C., a specific rotation $(a)_D$ of —11°, and an empirical formula of $C_{20}H_{32}O_2$, the hydrorosin acids having a melting point between about 200° C. and about 252° C.

4. The process of producing a resin acid lactone which comprises reacting crystalline hydrorosin acids with a strong mineral acid, and separating the unchanged acids from the resulting mixture comprising a resin acid lactone having a melting point of 98.5–100° C., a specific rotation $(a)_D$ of −11°, and an empirical formula of $C_{20}H_{32}O_2$, the hydrorosin acids having a melting point between about 200° C. and about 252° C.

5. The process of producing a resin acid lactone which comprises reacting a solution of crystalline hydrorosin acids with a strong mineral acid, and separating the unchanged acids from the resulting mixture comprising a resin acid lactone having a melting point of 98.5–100° C., a specific rotation $(a)_D$ of −11°, and an empirical formula of $C_{20}H_{32}O_2$, the hydrorosin acids having a melting point between about 200° C. and about 252° C.

6. The process of producing a resin acid lactone which comprises reacting a solution of crystalline hydrorosin acids with concentrated sulfuric acid, and separating the unchanged acids from the resulting mixture comprising a resin acid lactone having a melting point of 98.5–100° C., a specific rotation $(a)_D$ of −11°, and an empirical formula of $C_{20}H_{32}O_2$, the hydrorosin acids having a melting point between about 200° C. and about 252° C.

7. As a new product, a crystalline rosin acid lactone having a melting point of 98.5–100° C., a specific rotation $(a)_D$ of −11°, and an empirical formula of $C_{20}H_{32}O_2$.

8. The process of producing a resin acid lactone which comprises reacting crystalline hydrorosin acids with a strong mineral acid, and recovering a resin acid lactone having a melting point of 98.5–100° C., a specific rotation $(a)_D$ of −11°, and an empirical formula of $C_{20}H_{32}O_2$, the hydrorosin acids having a melting point of about 252° C.

RICHARD F. B. COX.